United States Patent Office 3,313,283
Patented Apr. 11, 1967

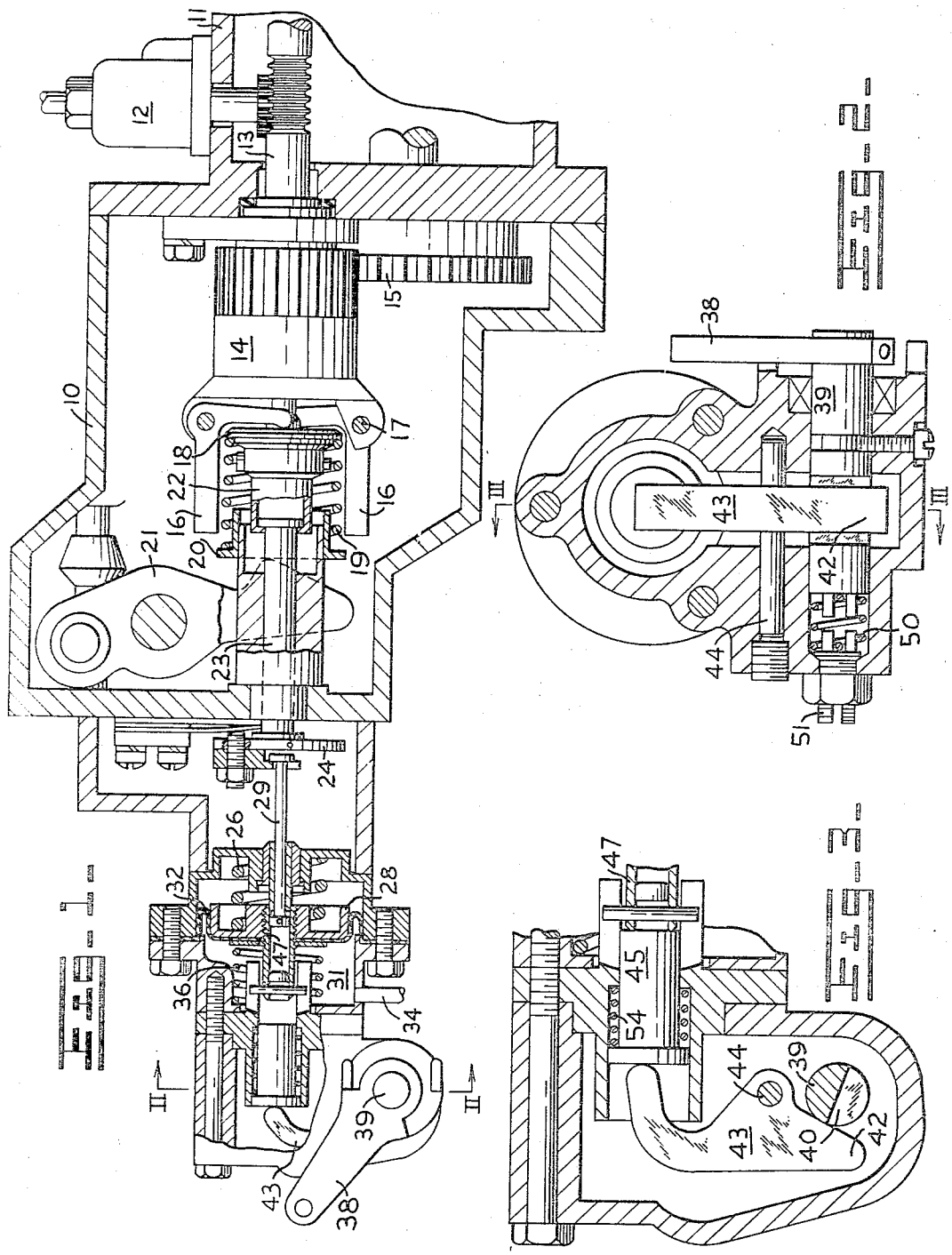

3,313,283
FUEL RATIO CONTROL OVERRIDE
Robert H. Miller, Peoria, Ill., assignor to Caterpillar Tractor Co., Peoria, Ill., a corporation of California
Filed June 4, 1965, Ser. No. 461,330
2 Claims. (Cl. 123—140)

ABSTRACT OF THE DISCLOSURE

The governor mechanism which has means to override or render ineffective fuel to air ratio controls on internal combustion engines to insure ample supply of fuel to combustion chambers during starting of the engine when the volume of air is relatively low, means acting automatically to disable the override means when the engine starts.

Devices are known for automatically preventing increase in fuel supply when inlet manifold pressure is too low to provide air to support combustion of the added fuel, which condition causes excessive smoking. Such devices are shown and the reasons for their use fully set forth in the patent to Parks 2,767,700 entitled, "Fuel Control for Supercharged Engines," and in the patent to Parks, Miller and Paluska 3,077,873 entitled, "Pressure Actuated Fuel Control for Supercharged Engines."

It is also recognized that such devices produce difficulty in starting an engine since they disable the control function of the governor until sufficient manifold pressure is available to allow the governor to increase the output of the fuel pump. Since manifold pressure sufficient to disable the above control devices is not available until after the engine starts, the output of the fuel pump will be limited during the starting cycle. This requires that the engine be motored for considerable length of time to introduce sufficient fuel for starting and results in excessive use of starting motors.

It is therefore an object of the present invention to provide means operable manually to completely disable the air to fuel ratio control device of an engine while it is shut down to facilitate starting of the engine. A further object of the invention is to provide means operable automatically upon starting of the engine to reset the disabling means and enable the fuel to air ratio control device to function. Further objects and advantages of the invention are made apparent in the following specification wherein it is described in detail by reference to the accompanying drawing.

FIG. 1 is a central cross-sectional view of a governor and an air to fuel ratio control and an override mechanism therefor embodying the present invention;

FIG. 2 is an enlarged sectional view taken on the line II—II of FIG. 1; and

FIG. 3 is a section taken on the line III—III of FIG. 2.

Referring first to FIG. 1, a governor housing is illustrated at 10 as being directly adjacent a fuel pump housing 11 which contains fuel pumps, one of which is shown at 12. The output of the pumps is controlled by a fuel control or rack bar 13 in a well known manner. The position of the rack bar is under control of the governor in housing 10, which comprises a carrier 14 driven as by an engine driven gear 15. Flyweights 16 pivoted to the carrier as at 17 swing outwardly in response to increases in engine speed and engage a thrust plate 18 which forms one seat for a governor spring 19. The other seat for this spring is a sliding collar 20 engaged by lever 21. Lever 21 is manually adjustable by control means, not shown, disposed exteriorly of the housing for compressing the governor spring and thus increasing engine speed in a well known manner. In the governor here illustrated, movement of the thrust plate 18 is transmitted to the rack bar 13 through a fluid servo means contained within the carrier 14. The details of construction of this servo are not necessary to an understanding of the present invention, but are fully disclosed in the Parks and Wellwood Patent Number 3,145,624 for Double Acting Hydraulic Servo Governor. An adapter 22, associated with thrust plate 18, is connected with a slideable bar 23, the free end of which has a plate 24 engageable by the lever 21 when it is moved in a clockwise direction to cause adjustment of the governor to shut down position. The governor housing between the lever 21 and plate 24 is provided with suitable openings, not shown, through which a bifurcated end of the lever 21 passes to engage the plate.

Compression of the governor spring to cause increase in fuel feed is prevented when the pressure in the intake manifold of the engine is insufficient to supply air to support combustion of the added fuel. This is accomplished with a spring 26 which is heavier than the governor spring 19, and which engages a piston 28 to urge it leftwardly, as viewed in FIG. 1 and, through a rod 29, urge the sliding rod 23, adapter 22, and thrust plate 18 toward the left. Thus, any movement of lever 21 counterclockwise will not adjust the position of the thrust plate 18 in a manner to affect increased fuel delivery. A chamber 31 to the left of piston 28 is sealed by a diaphragm 32 cooperating with the piston and is in communication with the inlet manifold of the engine by means of a conduit 34. With this construction, when pressure in the engine inlet manifold attains a sufficiently high value, it overcomes the biasing effect of spring 26 by urging the piston 28 toward the right and to a position which permits expansion of the governor spring 19, and normal function of the governor. A lighter spring 36 on the opposite side of the piston 28 opposes the action of the spring 26 establishing a condition of normal preloaded balance for the spring 26 so that it is extremely sensitive to variations in pressure in the chamber 31.

The present invention provides a mechanism to override the air to fuel ratio control just described including a lever 38 which may be connected with control means at the engine operator's station through suitable linkage, not shown. The lever 38 controls a shaft 39 which, as shown in FIGS. 2 and 3, has a flat portion 40 in registry with the tail 42 of a lever 43 pivoted as at 44 within the housing. This lever also has a finger at its opposite end, which engages a plunger 45 guided for sliding movement through a housing wall and having an end engageable as shown in FIG. 3 with the end of a tubular element 47 which is threaded in the piston 28 and serves as an adjusting means for the control mechanism in a manner which is not pertinent to an understanding of the present invention. When the lever 38 is swung to its disabling position, which is represented by the position of the shaft 39 in FIG. 3, the outer diameter of the shaft, by engaging the tail 42, urges the finger end into engagement with the member 45, which in turn urges member 47 toward the right and compresses spring 26, thus rendering the air to fuel ratio mechanism inoperative, and enabling easy starting of the engine from a shut down position when pressure has not been built up in the inlet manifold.

As soon as the engine starts, the shaft 39 and control lever 38 are returned or reset to their original position by a torsion spring, shown at 50 in FIG. 3, acting between a fixed adjusting member 51 and the shaft 39 as shown. Shaft 39 is frictionally held in the position shown in FIG. 3 by engagement of the tail 42, which is urged into firm contact therewith by the force of the spring 26. However, upon the build up of pressure in the inlet manifold and chamber 31, the piston 28 is again urged to the right, compressing spring 26 and so reducing the frictional engagement against the tail 42, that spring 50 rotates shaft 39 clockwise, as viewed in FIG. 3, presenting the flat 40 to the tail 42. A spring 54 serves to maintain the components of the override mechanism in snug contact with each other, preventing rattling and maintaining them out of contact with the fuel ratio control during normal engine operation.

I claim:

1. In combination with an engine governor for controlling flow of fuel to an internal combustion engine and having a fuel to air ratio control which comprises a spring tending to prevent an increase in fuel and means to disable the spring with pressure from the engine air supply when the pressure attains a sufficiently high value, manually actuated means to disable said spring when the engine is shut down to enable starting of the engine with low pressure air supply, the improvement which comprises means to hold said manual means in its actuated condition by friction, a spring urging it toward disengagement, and means actuated by the building up of air supply pressure to effect disengagement.

2. The combination of claim 1 in which the disabling means comprises a plunger, a pivoted lever having one end engageable with the plunger, a rotatable shaft engageable with the opposite end of the lever and having a slat side, means to rotate the shaft to bring the flat side into contact with the lever to release the plunger or the opposite side against the lever to depress the plunger.

References Cited by the Examiner

UNITED STATES PATENTS

| | | | |
|---|---|---|---|
| 2,156,933 | 5/1939 | Alden | 123—140 |
| 2,767,700 | 10/1956 | Parks | 123—140 |
| 3,077,873 | 2/1963 | Parks et al. | 123—140.2 |

MARK NEWMAN, *Primary Examiner.*

LAURENCE M. GOODRIDGE, *Examiner.*